(12) United States Patent
Theobald

(10) Patent No.: US 9,592,759 B1
(45) Date of Patent: Mar. 14, 2017

(54) LOADING ITEMS ONTO A VEHICLE

(71) Applicant: Vecna Technologies, Inc., Cambridge, MA (US)

(72) Inventor: Daniel Theobald, Somerville, MA (US)

(*) Notice: Subject to any disclaimer, the term of this patent is extended or adjusted under 35 U.S.C. 154(b) by 108 days.

(21) Appl. No.: 14/446,009

(22) Filed: Jul. 29, 2014

(51) Int. Cl.
*B65G 1/137* (2006.01)
*B60P 1/48* (2006.01)
*B65G 1/04* (2006.01)

(52) U.S. Cl.
CPC .............. *B60P 1/48* (2013.01); *B65G 1/0492* (2013.01); *B65G 1/1375* (2013.01)

(58) Field of Classification Search
CPC .................................................. B65G 1/1375
USPC .................................................. 414/338, 389
See application file for complete search history.

(56) References Cited

U.S. PATENT DOCUMENTS

| | | | | |
|---|---|---|---|---|
| 3,547,266 A * | 12/1970 | Michel | ..................... | E01B 29/06 209/539 |
| 3,727,778 A * | 4/1973 | Hollenbach | ............... | B66F 9/14 280/638 |
| 3,845,868 A * | 11/1974 | Myers | .................... | B65F 3/0206 414/338 |
| 4,508,484 A * | 4/1985 | Heiz | ....................... | B65G 47/61 198/597 |
| 4,678,390 A * | 7/1987 | Bonneton | ............ | B65G 1/1375 294/4 |
| 4,792,273 A * | 12/1988 | Specht | ................... | B65G 1/137 414/273 |
| 5,211,523 A * | 5/1993 | Andrada Galan | ........ | B60L 3/04 180/168 |
| 5,730,252 A * | 3/1998 | Herbinet | .............. | B65G 1/1371 186/52 |
| 7,097,045 B2 * | 8/2006 | Winkler | ............... | B65G 1/1378 209/630 |
| 2005/0238465 A1 * | 10/2005 | Razumov | ................ | A47F 10/02 414/273 |
| 2011/0058926 A1 * | 3/2011 | Winkler | ............... | B65G 1/0485 414/795.4 |
| 2013/0184854 A1 * | 7/2013 | Bastian, II | ........... | B65G 1/1375 700/217 |
| 2015/0032252 A1 * | 1/2015 | Galluzzo | .............. | B65G 1/1375 700/218 |
| 2015/0213695 A1 * | 7/2015 | Carlson | .................... | G08B 5/00 340/815.4 |
| 2015/0360865 A1 * | 12/2015 | Massey | ................ | B65G 1/1373 414/275 |

* cited by examiner

*Primary Examiner* — James Keenan
(74) *Attorney, Agent, or Firm* — Albert J. Brunett

(57) ABSTRACT

A method of loading at least one item onto a vehicle is provided. The method includes providing at least one vehicle for operation in a desired environment, providing at least one mechanism operably connected to a portion of the vehicle, and gathering at least one item as the vehicle travels in the desired environment. The method further includes arranging the items on the vehicle via the mechanism based on at least one criterion, such as the weight of the items, so that the items can be loaded onto the vehicle without needing the vehicle to travel to the items in a specific order to thereby enable the vehicle to operate more quickly in the desired environment and conserve power.

2 Claims, 5 Drawing Sheets

LOADING ITEMS ONTO A VEHICLE

BACKGROUND OF THE INVENTION

Field of the Invention

The present invention relates generally to loading items onto a vehicle.

Background Information

Items may need to be loaded onto vehicles for a variety of reasons. Often times these items need to be gathered in a specific order so they can be positioned in a certain arrangement. This existing technique, however, may require the vehicle to travel along lengthy routes and lead to increased power consumption.

SUMMARY OF THE INVENTION

A method of loading at least one item onto a vehicle is provided. The method includes providing at least one vehicle for operation in a desired environment, providing at least one mechanism operably connected to a portion of the vehicle, and gathering at least one item as the vehicle travels in the desired environment. The method further includes arranging the items on the vehicle via the mechanism based on at least one criterion, such as the weight of the items, so that the items can be loaded onto the vehicle without needing the vehicle to travel to the items in a specific order to thereby enable the vehicle to operate more quickly in the desired environment and conserve power.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

Figure 1:
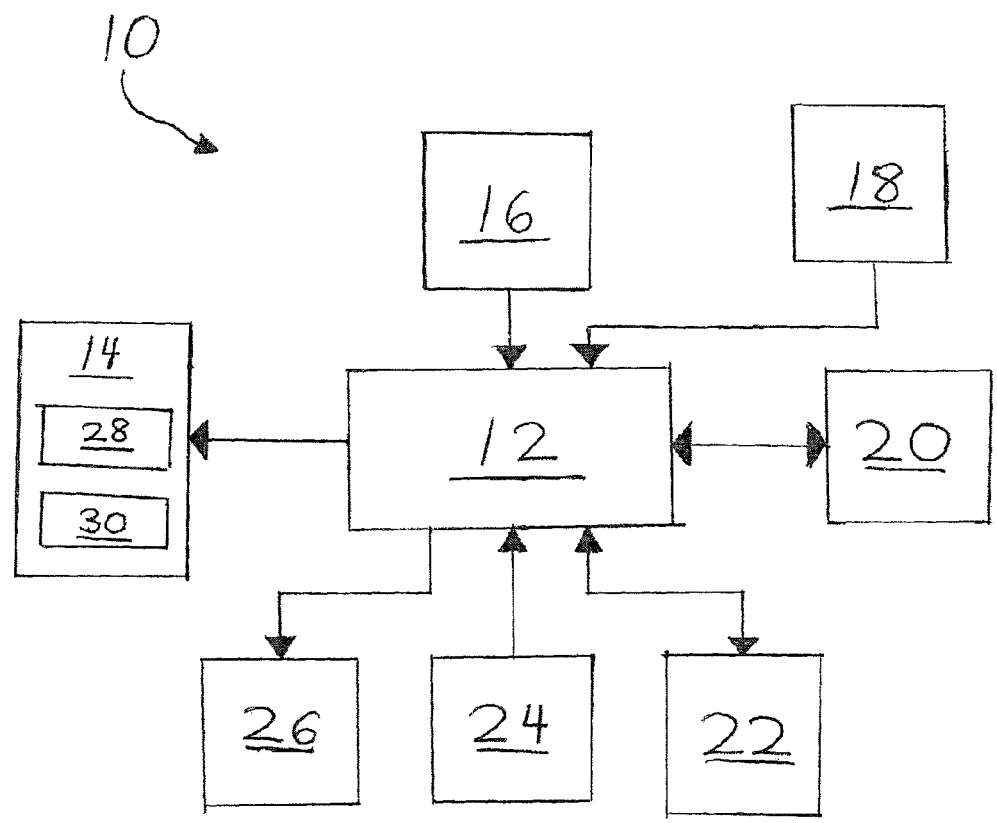
FIG. 1 generally illustrates a block diagram of a vehicle in accordance with one embodiment of the invention.

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference numbers are employed for designating the same elements throughout the figures.

The present invention is generally related to loading items onto a vehicle. In the context of this invention, the term "vehicle" may include a car, forklift, truck, pallet jack, robot, boat, very narrow aisle (VNA) lift truck, van, or any other type of vehicle. In the context of this invention, the term "item" may refer to boxes, crates, containers, packages, barrels, canisters, luggage, chests, bags, or any other type of tangible item.

These items may need to be loaded onto a surface (such as on a vehicle) in accordance with certain requirements. For example, it may be desirable to arrange heavier items immediately on the surface, and to have lighter items positioned on top of the heavier items. This may, among other advantages, create a lower center of gravity and decrease the likelihood of heavy items damaging other items.

Or, it may be desirable to arrange items on a surface based on their physical volume. Arranging items with smaller volumes on top of items with larger volumes may provide a more stable arrangement, for example.

It may also be desirable to arrange items based on the order in which the items are to be removed from the surface. If several items on a surface are to be distributed at different destinations, the items may be arranged such that those being distributed at the earlier destinations are at the front of the surface or on top of other items (essentially providing easier access for removal).

The features of the invention do not require the vehicle to travel to the items in a specific order. Rather, the vehicle in accordance with the invention may include a mechanism that can arrange the items as desired once they are on the vehicle. For example, lighter items may be gathered before the heavier items and the mechanism may then arrange the items such that the lighter items are on top of the heavier items.

Because items can be arranged as desired after they are gathered (picked from a pickup location and placed onto the vehicle), the order in which the items are gathered is immaterial. This allows the vehicle to follow the shortest route available that visits each item's pickup location and therefore leads to shorter mission times and decreased power consumption.

The features of the invention may be advantageous in applications such as warehouse systems for shipping/receiving items. In this type of application, items are frequently gathered and transported to locations for storage, use, or further shipment.

Similarly, military and other shipping services may benefit from the features of the invention, as well as any other type of logistic operations. Other types of logistic operations may include applications in health care facilities, hospitality resorts, correctional facilities, and retail stores. This list is merely exemplary, and applicant contemplates a wide variety of applications that may benefit from the features of the invention.

FIG. 1 generally illustrates a block diagram of a vehicle 10 in accordance with one embodiment of the invention. The vehicle 10 may include a control device 12 implemented using hardware or a combination of hardware and software. The control device 12 may include one or more processing devices, analog and/or digital circuitry, and be in operable communication with other components such as a manipulator mechanism 14, a sensor system 16, a receiver element 18, memory 20, an interface 22, a power source 24, and a mobility platform 26.

Briefly, in operation the control device 12 may receive a list of items to be gathered in a desired environment. Based on the locations of the items (as known by a central computing device, for example), the control device 12 may generate a route for the vehicle 10 to follow to gather the items. This may be the shortest possible route that visits each item location so that the vehicle does not need to travel greater distances or otherwise operate for longer than necessary.

As items are being gathered (or after all items have been gathered), the manipulator mechanism 14 may arrange the items on the vehicle 10 as desired. For example, the manipulator mechanism 14 may arrange the items such that the heavier items are positioned directly on the vehicle, and lighter items are positioned on the heavier items.

As stated previously, the vehicle 10 may be any type of vehicle, depending on the application. The vehicle 10 may also include a pallet or other type of removable support surface for supporting the items.

Depending on the embodiment, the vehicle 10 and the manipulator mechanism 14 may be autonomous or controlled by an operator. Similarly, the vehicle 10, along with the manipulator mechanism 14 may be operated remotely.

The manipulator mechanism 14 may be configured to interact with or otherwise manipulate items in the environment. To pick up or otherwise gather items, the manipulator mechanism 14 may include some type of engagement mechanism or the like, such as, for example, at least one robotic arm member 28 that may be electronically, hydraulically, pneumatically or mechanically actuated. Each arm member 28 may also be configured with an end effector 30 such as a hand member or other gripping device such as a suction device, an electromagnet, or any other device whether available now or invented hereafter as long as it can manipulate the items as desired.

The manipulator mechanism 14 may be controlled remotely by an operator, controlled by an operator positioned on the vehicle 10, or may be fully autonomous. If the manipulator mechanism is fully autonomous, the manipulator mechanism 14 may rely on sensor devices of the sensor system 16 (described below) to locate, gather, and arrange the items.

The manipulator mechanism 14 may also scan or otherwise receive information directly from the items. For example the manipulator mechanism 14 may include a bar code scanning device that may scan the exterior of the items to obtain information such as their weights, volumes, footprints, destinations, or any other type of information regarding the items.

The sensor system 16 may include any type of sensor device that can gather information regarding the environment surrounding the vehicle 10 and the manipulator mechanism 14, such as the items' locations and orientations. For example, the sensor system 16 may include cameras such as those described in detail in applicant's allowed patent application Ser. No. 12/626,990 entitled "System for Providing Camera Views", the disclosure of which is hereby incorporated herein by reference in its entirety.

The sensor system 16 may alternatively or additionally include global positioning system (GPS) sensors, 3D cameras (e.g., LIDAR), infrared cameras, stereoscopic cameras, inertial sensors, odometric sensors, radar, electro-acoustic transducers (microphones), and/or other types of devices that assist the vehicle 10 in surveying and navigating within its environment. The number of, type of, and positions of the sensor devices of the sensor system 16 may vary as long as the features of the invention can be accomplished.

The receiver element 18 may receive commands via a wireless connection from a central computing device (not shown). For example, the receiver element 18 may receive a list of items to be gathered, as well as information regarding the items' locations, weights, volumes, shapes, destinations, contents, and/or other characteristics.

The memory 20 may be configured to store software such as instructions for execution by the control device 12. The memory 20 may include volatile and/or non-volatile memory, and may also be configured to store information regarding the environment such as where certain items are located, along with other characteristics mentioned previously.

An interface 22 may be used and configured to receive instructions or commands from an operator (such as a list of items to be gathered) if the vehicle 10 is autonomous or semi-autonomous, for example. The interface 22 may include an input/output (I/O) device such as a display screen or a touch pad. The interface 22 may also output the generated path for an operator to follow to make item pickups.

The power source 24 may be configured to supply power to the control device 12 and/or other components of the vehicle 10. The power source 24 may include, for example, a battery or a series of batteries, rechargeable batteries, battery packs, and/or the like.

In one embodiment, the control device 12 may, before starting a mission, determine whether or not there is enough power to complete the mission. For example, if an item is to eventually be delivered to a customer, and the vehicle 10 runs out of power during delivery, the delivery order would not be fulfilled.

The mobility platform 26 may move the vehicle 10 throughout its environment. The configuration of the mobility platform may of course vary. For example, the mobility platform 26 may include motorized drive wheels or motorized track systems.

Figure 2:
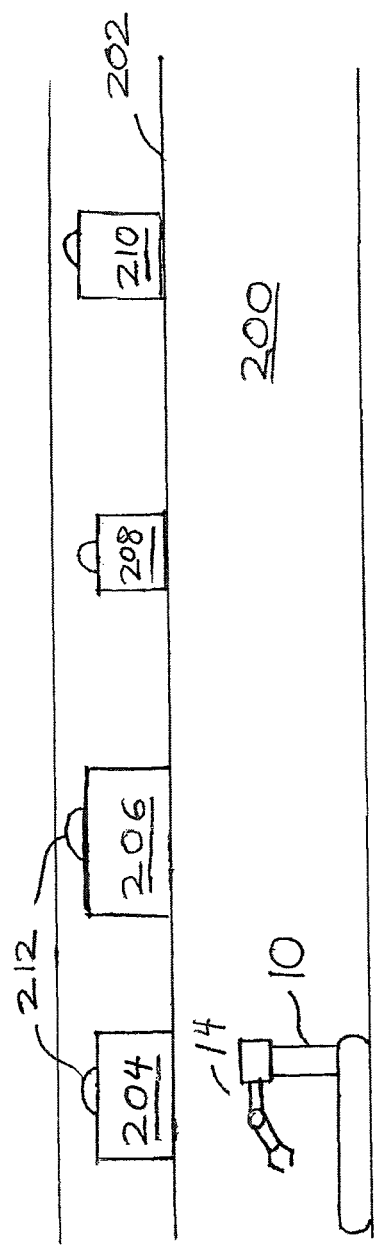
FIG. 2 generally illustrates a vehicle traveling in an area in accordance with one embodiment of the invention.

To generally illustrate an advantage of the invention, FIG. 2 shows a vehicle 10 with the manipulator mechanism 14 traveling in an aisle 200. This may be in a warehouse, for example, in which the vehicle 10 may be assigned to gather items 204, 206, 208, and 210, and to transport these items to a location for further shipment, storage, or use.

Assume the items 204, 206, 208, and 210 are items of varying weights and/or sizes. Assume also that because of these characteristics, it is desirable to place the heavier and/or larger items directly on the vehicle 10, and to place the smaller and/or lighter items on top of the heavier and/or larger items.

Not only may the manipulator mechanism 14 remove the items from the shelf 202 (via handles 212, for example), but the manipulator mechanism 14 may also arrange the items as desired once the items are on the vehicle 10. Therefore, the vehicle 10 may only need to travel up/down the aisle 200 once, rather than back and forth multiple times to gather items in a specific order.

Figure 3:
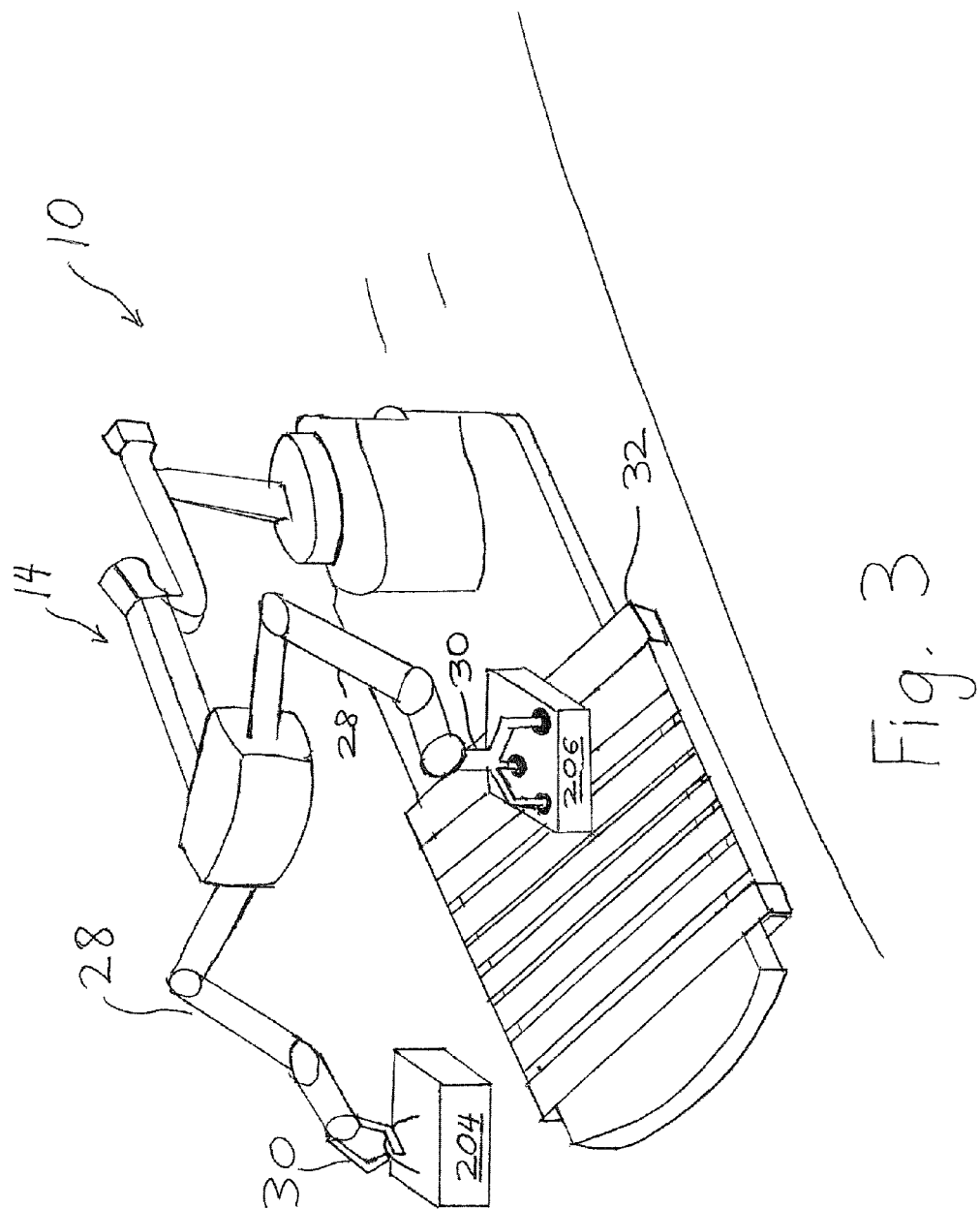
FIG. 3 generally illustrates a vehicle in accordance with one embodiment of the invention.

FIG. 3 generally illustrates a vehicle 10 in accordance with one embodiment of the invention. The vehicle 10 in this embodiment may be autonomous and includes the manipulator mechanism 14 and a support surface 32 (e.g., a pallet). The vehicle 10 may travel within the environment to gather/arrange items onto the support surface 32, and then transport the support surface 32 and the gathered items to a location for further shipment, storage, or use.

The manipulator mechanism 14 of FIG. 3 includes two arm members 28. Only one arm member 28 may be used, or multiple arm members 28 may be used to accomplish the item gathering and/or arranging.

The arm members 28 of FIG. 3 each include an end effector 30 for manipulating items 204 and 206. In this particular embodiment, the end effectors 30 include a clasping device (holding item 204) and suction devices (holding item 206). However, any other type of end effector may be used as long as it can accomplish the features of the invention.

Figure 4:
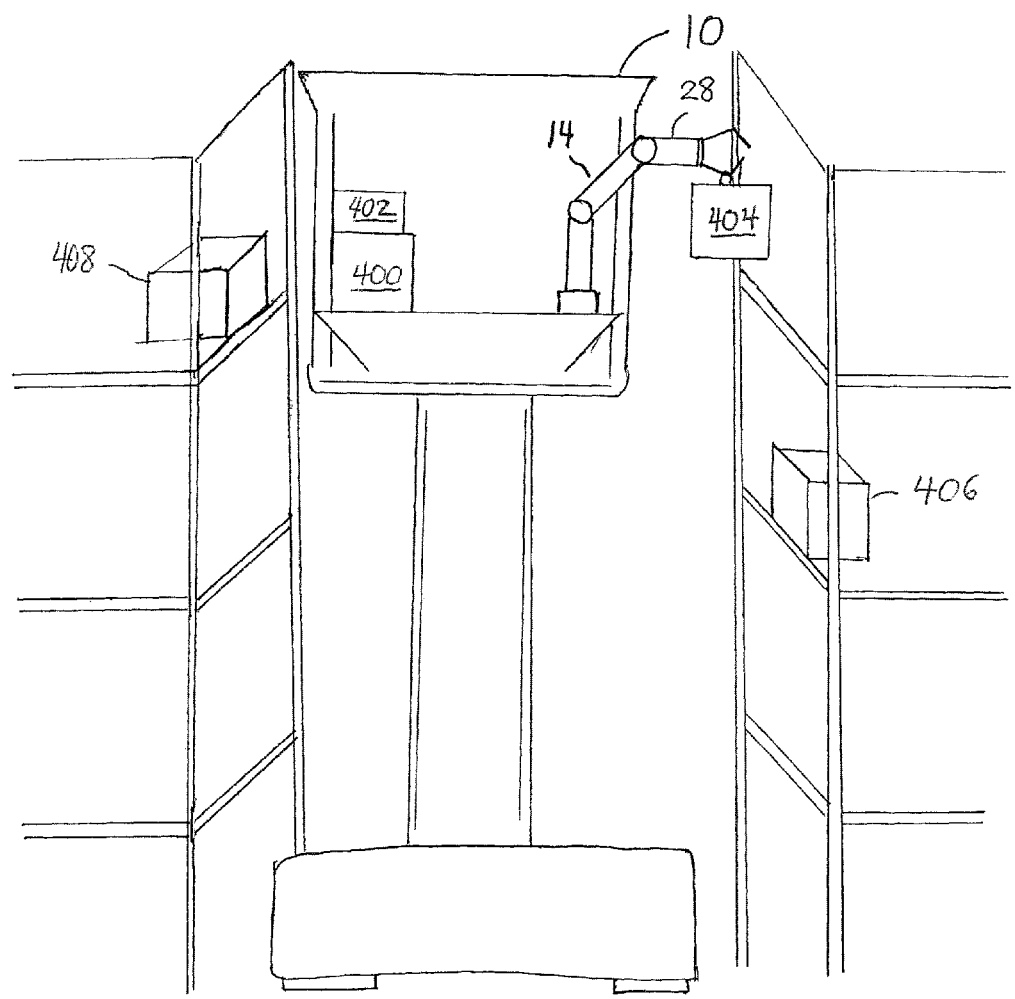
FIG. 4 generally illustrates a vehicle in accordance with another embodiment of the invention.

FIG. 4 generally illustrates the vehicle 10 in accordance with another embodiment of the invention. In this embodiment, the vehicle 10 is a device that is designed to maneuver in narrow areas, and can extend vertically to reach items that are located on high shelves or other elevated areas.

As stated previously, the manipulator mechanism 14 may gather items 400, 402, 404, 406, and 408 without requiring the vehicle 10 to come to a stop. This saves time and conserves power not only because there is less "stop and go," but also because the manipulator mechanism 14 (or a human) does not need to wait for the vehicle 10 to stop "swaying," which may occur after the vehicle 10 (particularly a vertically extended vehicle) comes to a stop.

When gathering an item while the vehicle 10 is in motion, the manipulator mechanism 14 (along with the vehicle 10), may take into account the speed of the vehicle 10 along with the weight of item. The manipulator mechanism 14 may be configured to provide a certain amount of "give" when gathering the item to create a less rigid connection.

Figure 5:
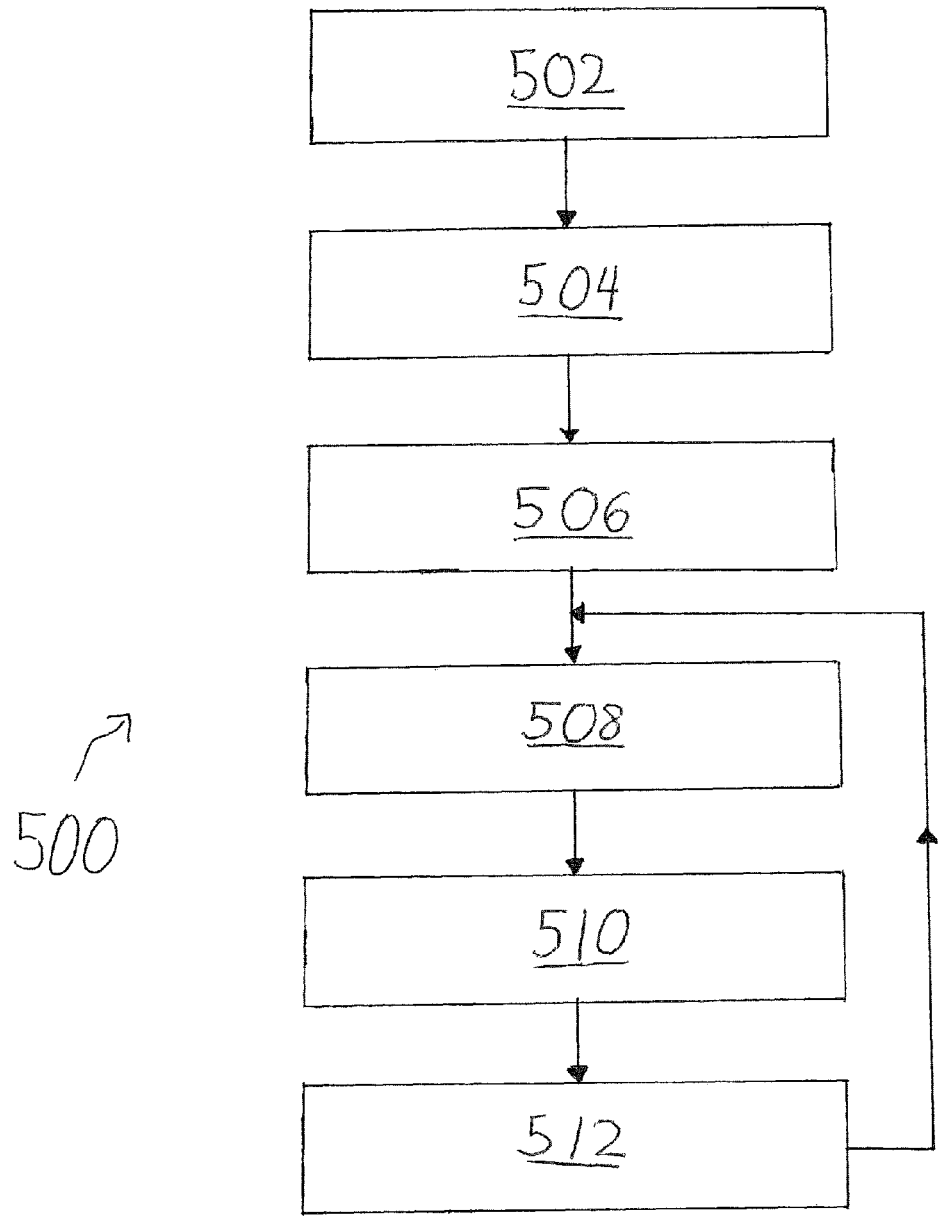
FIG. 5 generally illustrates a method of loading items onto a vehicle in accordance with one embodiment of the invention.

FIG. 5 generally illustrates a method 500 of loading items onto a vehicle in accordance with one embodiment of the invention. The steps of method 500 may be carried out using the components described above.

In step 502, the vehicle 10 may receive a list of items to be gathered from an area. If the vehicle 10 is autonomous, the list may be communicated to the vehicle 10 via a wireless connection. Additionally and alternatively, a human operator may input instructions regarding items to be gathered via the interface 22.

In step 504, the control device 12 may access the receiver element 18 or memory 20 to determine the locations of the items to be gathered. The locations of items may be updated as they are moved (whether by humans or robots) from locations within the area.

Based on the locations of the items, the control device 12 may, in step 506, autonomously generate a route for the vehicle to follow to gather the items. The route may be a path that visits each item's pickup location by traveling the shortest distance possible. If a human operator is driving the vehicle 10, the generated path may be outputted to the operator via the interface 22.

In step 508 the vehicle begins to travel along the generated path. If the vehicle 10 is autonomous, it may rely on the sensor system 16 to navigate through the area. Alternatively, a human operator may control the vehicle 10.

In step 510, and once at an item pickup location, the control device 12 may signal the manipulator mechanism 14 to gather the item and place it onto the vehicle 10. The manipulator mechanism 14 may use one or more robotic arm members 28 and any applicable end effectors 30 to manipulate the items as desired.

As stated previously, and to expedite the item-gathering process, the manipulator mechanism 14 may gather an item as the vehicle 10 approaches the item without requiring the vehicle 10 to decrease its speed or come to a stop. Not only does this decrease the overall mission time, but it also decreases vehicle power consumption as there is less accelerating and decelerating of the vehicle 10.

In step 512 the manipulator mechanism 14 may position the item on the vehicle 10 in a specific arrangement. Steps 508, 510, and 512 may be repeated as necessary to gather and arrange items in accordance with any desired criteria.

The manipulator mechanism 14 may arrange items as the vehicle 10 is traveling between locations. In certain embodiments, and as stated previously, the manipulator mechanism 14 may include multiple robotic arm members for gathering and arranging the items.

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

What is claimed is:

1. A method of loading a plurality of items onto an autonomous mobile robot and delivering the items to a desired end location, comprising:
   providing at least one fully autonomous mobile robot for independent operation in an environment and providing pick and place capabilities for a plurality of items located in various different positions within the environment so that the robot can pick various items and place them initially on desired positions on the robot;
   providing at least one robotic arm member secured to the autonomous mobile robot for operable communication with respect to the autonomous mobile robot;
   providing a list of desired items to be picked by the robot as it moves about the environment;
   enabling the autonomous mobile robot to independently move to the various positions within the environment where the various items are located based on a path determined by a control device to be the fastest path to gather the desired items in order to conserve power to the robot and speed up the picking of the items without regard to any other criteria;
   gathering the items on the list from their respective different positions within the environment with the robotic arm member and placing the items on a desired first initial position on the robot;
   moving one or more items as needed from their respective first positions on the robot to one or more second positions on the robot to better accommodate the items on the mobile robot as the mobile robot continues to move through the environment and gather the additional items on the list; and
   transporting all of the gathered items on the list to a desired end location within the environment for further processing, handling or packaging.

2. The method as defined in claim 1, including enabling the arm member to move items from the first position on the mobile robot to the second position on the mobile robot as the mobile robot is moving within the environment.

\* \* \* \* \*